US010641431B2

(12) United States Patent
Mallick et al.

(10) Patent No.: US 10,641,431 B2
(45) Date of Patent: May 5, 2020

(54) LIGHTWEIGHT COMPOSITE OVERWRAPPED PRESSURE VESSELS WITH SECTIONED LINERS

(71) Applicant: Steelhead Composites, LLC, Golden, CO (US)

(72) Inventors: Kaushik Mallick, Thornton, CO (US); Michael W. Stewart, Wheat Ridge, CO (US); Annalisa Padget-Shields, Englewood, CO (US); Jacob Schrader, Westminster, CO (US); John Cronin, Lakewood, CO (US); Andrew Coors, Houston, TX (US)

(73) Assignee: STEELHEAD COMPOSITES, LLC, Golden, CO (US)

( * ) Notice: Subject to any disclaimer, the term of this patent is extended or adjusted under 35 U.S.C. 154(b) by 0 days.

(21) Appl. No.: 15/389,374

(22) Filed: Dec. 22, 2016

(65) Prior Publication Data

US 2018/0180221 A1 Jun. 28, 2018

(51) Int. Cl.
*F16L 55/04* (2006.01)
*F17C 1/06* (2006.01)

(52) U.S. Cl.
CPC ........ *F17C 1/06* (2013.01); *F17C 2201/0109* (2013.01); *F17C 2201/0185* (2013.01); *F17C 2201/056* (2013.01); *F17C 2201/058* (2013.01); *F17C 2201/06* (2013.01); *F17C 2203/0604* (2013.01); *F17C 2203/066* (2013.01); *F17C 2203/0619* (2013.01); *F17C 2203/0629* (2013.01); *F17C 2203/0634* (2013.01); *F17C 2203/0639* (2013.01); *F17C 2203/0646* (2013.01); *F17C 2203/0648* (2013.01); *F17C 2203/0665* (2013.01); *F17C 2203/0668* (2013.01); *F17C 2209/2109* (2013.01); *F17C 2209/2154* (2013.01); *F17C 2209/227* (2013.01); *F17C 2209/232* (2013.01); *F17C 2221/014* (2013.01); *F17C 2221/016* (2013.01); *F17C 2223/0123* (2013.01); *F17C 2260/011* (2013.01); *F17C 2270/0554* (2013.01)

(58) Field of Classification Search
CPC ........ F17C 1/06
USPC ........ 138/30, 31
See application file for complete search history.

(56) References Cited

U.S. PATENT DOCUMENTS 2,339,876 A * 1/1944 Phillips .................. F15B 1/125 138/30
2,904,077 A * 9/1959 Trumper ................ F16F 9/082 138/30

(Continued)

*Primary Examiner* — James F Hook
(74) *Attorney, Agent, or Firm* — Don D. Cha; HDC IP Law, LLP

(57) ABSTRACT

The present invention provides a lightweight high pressure vessels that are made from a liner or a liner housing that is overwrapped with a composite material. Unlike conventional high pressure vessels, the lightweight high pressure vessel of the invention includes a liner that comprises a plurality of liner sections without using welding or crimping. In particular, the lightweight high pressure vessels of the invention include a plurality of elements that are combined to form a liner housing and a composite overwrap that provides structural and mechanical strength to maintain integrity of the high pressure vessel. In one particular embodiment, the high pressure vessel of the invention is a diaphragm accumulator.

20 Claims, 3 Drawing Sheets

100

(56) References Cited

U.S. PATENT DOCUMENTS

| | | | | | | |
|---|---|---|---|---|---|---|
| 3,168,907 | A | * | 2/1965 | Mercier | F15B 1/125 | 138/30 |
| 3,240,644 | A | * | 3/1966 | Wolff | B29C 53/602 | 156/165 |
| 3,319,420 | A | * | 5/1967 | Mercier | F15B 1/20 | 138/30 |
| 3,420,273 | A | * | 1/1969 | Greer | A01B 61/046 | 137/513.3 |
| 3,825,034 | A | * | 7/1974 | Chouings | F15B 1/106 | 138/30 |
| 4,367,786 | A | * | 1/1983 | Hafner | F15B 1/086 | 138/30 |
| 4,589,562 | A | * | 5/1986 | Fawley | B29C 63/24 | 138/104 |
| 4,595,037 | A | * | 6/1986 | LeBreton | F15B 1/14 | 138/30 |
| 4,603,711 | A | * | 8/1986 | Porel | F15B 1/106 | 138/30 |
| 4,714,094 | A | * | 12/1987 | Tovagliaro | F15B 1/24 | 138/31 |
| 4,785,956 | A | * | 11/1988 | Kepler | B29C 53/605 | 138/30 |
| 5,284,996 | A | * | 2/1994 | Vickers | B64G 1/22 | 220/590 |
| 5,368,073 | A | * | 11/1994 | Murphy | F16L 55/053 | 138/26 |
| 5,499,739 | A | * | 3/1996 | Greist, III | B29C 53/602 | 138/30 |
| 5,606,996 | A | * | 3/1997 | Sugimura | F16L 55/053 | 138/26 |
| 5,822,838 | A | * | 10/1998 | Seal | B21D 51/24 | 29/469.5 |
| 6,325,108 | B1 | * | 12/2001 | Bettinger | F16L 9/133 | 138/153 |
| 7,152,932 | B2 | * | 12/2006 | Kuznicki | B60K 6/12 | 303/87 |
| 2003/0111473 | A1 | * | 6/2003 | Carter | F17C 1/06 | 220/586 |
| 2003/0151171 | A1 | * | 8/2003 | LeBreton | B29C 70/446 | 264/571 |
| 2003/0183638 | A1 | * | 10/2003 | Minta | F17C 1/002 | 220/560.13 |
| 2004/0026431 | A1 | * | 2/2004 | Jones | F17C 1/06 | 220/588 |
| 2004/0045615 | A1 | * | 3/2004 | Rupp | F15B 1/106 | 138/30 |
| 2007/0131295 | A1 | * | 6/2007 | Rose | B60T 1/10 | 138/30 |
| 2009/0126815 | A1 | * | 5/2009 | Rajabi | F15B 1/24 | 138/31 |
| 2009/0139987 | A1 | * | 6/2009 | Handa | H05B 6/06 | 219/628 |
| 2010/0084033 | A1 | * | 4/2010 | Hummelt | F15B 1/106 | 138/30 |
| 2011/0056960 | A1 | * | 3/2011 | Blanc | B29C 53/602 | 220/588 |
| 2012/0234840 | A1 | * | 9/2012 | Strassburger | F17C 1/04 | 220/590 |
| 2013/0092311 | A1 | * | 4/2013 | Kobayashi | F17C 1/06 | 156/64 |
| 2014/0299609 | A1 | * | 10/2014 | Baltes | F15B 1/086 | 220/581 |
| 2014/0311603 | A1 | * | 10/2014 | Baltes | F15B 1/086 | 138/30 |
| 2015/0013814 | A1 | * | 1/2015 | Preston | F15B 1/025 | 138/30 |
| 2015/0102043 | A1 | * | 4/2015 | Nettis | F17C 1/06 | 220/586 |

* cited by examiner

LIGHTWEIGHT COMPOSITE OVERWRAPPED PRESSURE VESSELS WITH SECTIONED LINERS

FIELD OF THE INVENTION

The present invention relates to lightweight composite overwrapped high pressure vessels and methods for producing and using the same. In particular, the lightweight high pressure vessels of the invention include a plurality of elements that are combined to form a liner housing and a composite overwrap that provides structural and mechanical strength to maintain integrity of the high pressure vessel. In one particular embodiment, the high pressure vessel of the invention is a diaphragm accumulator.

BACKGROUND OF THE INVENTION

High pressure vessels are typically fabricated in a single piece construction using, for example, steel, or are welded together to prevent leakage. Conventional methods of producing high pressure vessels include rolling the material into a desired shape and often forging parts that are welded together. Some mechanical properties of steel may be adversely affected by welding, unless special precautions are taken. Using welding to manufacture high pressure vessels introduces point of failure as well as increasing the time and cost of producing high pressure vessels.

Some high pressure vessels are used as diaphragm accumulators. These accumulators are typically made of steel. They are traditionally of two distinct designs: threaded and welded. The former design allows for replaceable/serviceable diaphragms, while the latter does not. In both design variations, thick steel shells are mated together with a diaphragm captured in between, typically in the proximity of the threaded or the welded joint. The steel shell supports the structural load arising from the internal pressure. In the threaded version, the two halves are machined for threads and seal interface. The pressure sealing of the accumulator at the threaded joint is achieved by compression or securing the elastic diaphragm periphery close to the threaded joint. The fluid and gas ports are either integral to the shell or welded on to them using a secondary traditional welding process.

In the welded version, the two sections of the shell are manufactured using casting, forging or machining followed by weld at the seam. The halves are welded using laser or electron beam to avoid heat ingress inside the shell that can damage the diaphragm. In most legacy diaphragm accumulators of welded kind, the diaphragm is held in place during mating of the two halves at the equator using a metal clip that prevents the diaphragm from slipping inside the inside surface.

Some accumulator manufacturers have attempted to reduce weight of diaphragm accumulators by substituting steel with lighter and/or stronger materials, such as aluminum, titanium or brass and reducing the wall thickness of the shell. Other attempts to produce lighter diaphragm accumulators include replacing the steel shells (cylinder with domes) with aluminum, welding the two aluminum halves and overwrapping them with composite material. However, there has been limited effort in designing diaphragm accumulators that does not require welding or threading altogether.

Because welding or threading adds to the complexity and time to production of high pressure vessels in general and diaphragm accumulators in particular, it is desirable to produce a high pressure vessels or diaphragm accumulators without the use of welding or threading. Furthermore, as high pressure vessels find use in a wide variety of application, such as diaphragm accumulators in robotics, automobiles, aircrafts, prosthetics, pulsation dampeners, etc., it is desirable to produce high pressure vessels that are significantly lighter in weight yet providing the same or greater pressure gradient without the need for welding.

SUMMARY OF THE INVENTION

Conventional high pressure vessels are typically manufactured as a single piece pressure vessel housing (sometimes referred to herein as "liner"). Other conventional higher pressure vessels such as a diaphragm accumulators are fabricated from two or more elements (or pieces or segments) and are welded or threaded to form the high pressure housing.

In contrast, the lightweight high pressure vessels of the present invention include a liner housing made (referred to as a liner) from a plurality of housing part, elements or segments without welding or threading. In particular, the lightweight high pressure vessels of the present invention comprise a composite overwrap over the liner that provides mechanical strength and structural support.

One particular aspect of the invention provides a lightweight composite overwrapped pressure vessel comprising a liner and a composite overwrap encasing said liner. The composite overwrap provides mechanical strength for holding and maintaining the liner housing's integrity under high pressure. The liner comprises a plurality of sections joined together to form said liner. In some embodiments, the joint (i.e., joining area of two or more sections) between two or more liner sections includes an elastomeric seal such as an O-ring or other means to prevent fluid leakage within the joint. In other embodiments, a peripheral edge of a first section comprises a channel such that a peripheral edge of a second section that is joined together with said first section forms a slot. In some instances an O-ring or other non-welding, non-threaded or adhesive means for sealing the joints together is present.

The composite overwrap encasing the liner provides the necessary mechanical strength for holding the pressure vessel under pressure. In some embodiments, the composite overwrap also provides sealing means to prevent leakage of a fluid medium contained within the liner of the pressure vessel.

Yet in other embodiments, the lightweight high pressure vessel of the invention is a diaphragm accumulator. In this particular embodiment, in some instances the liner includes a top and a bottom sections. In some cases, the top and the bottom liner sections comprise first and second connections (e.g., ports having a valve or other mechanisms), respectively, for introducing first and second pressure mediums, respectively; and an elastomeric separation diaphragm subdividing an interior of said liner into first and second pressure medium storage areas. In this manner, the first pressure medium storage area accommodates a first pressure medium, and the second pressure medium storage area accommodates a second pressure medium. In other cases, the peripheral edge of the separation diaphragm is inserted into the slot, thereby securing the peripheral edge of said liner sections separating diaphragm therebetween.

As discussed herein, the plurality of sections of the liner is joined together without welding, threading or crimping forming an accumulator housing. The composite overwrap provides the necessary mechanical strength and maintains the structural integrity of the lightweight high pressure vessel.

Yet in some embodiments, the parameter of [(maximum service pressure×internal volume)/mass of said pressure vessel] of the lightweight composite overwrap pressure vessel is in the range of 10,000 to 100,000 Pa*m$^3$/kg. Still in another embodiment, the parameter of [(maximum service pressure×internal volume)/mass is at least 20,000 Pa*m$^3$/kg.

Another aspect of the invention provides a lightweight composite overwrapped diaphragm accumulator comprising an accumulator housing and a composite overwrap encasing the accumulator housing. The composite overwrap encasing the accumulator housing provides mechanical strength for holding the accumulator housing under pressure and also provides a sufficient stiffness and mechanical strength to prevent leakage of first or second pressure medium that may be present in the diaphragm accumulator housing.

In some embodiments, the accumulator housing comprises a top and a bottom liner sections joined together to form said accumulator housing. In some cases, the peripheral edge of one of said top or bottom liner sections contains a channel such that the peripheral edges of top and bottom liner sections that are joined together forms a slot. In other embodiments, said top and bottom liner sections comprise first and second connections (e.g., fittings or valves), respectively, for introducing first and second pressure mediums, respectively. In addition, the accumulator housing also includes an elastomeric separation diaphragm subdividing an interior of said accumulator housing into first and second pressure medium storage areas, said first pressure medium storage area accommodating first pressure medium, said second pressure medium storage area accommodating second pressure medium. In some cases, the peripheral edge of the separation diaphragm is inserted into said slot, thereby securing the peripheral edge of said separating diaphragm therebetween.

Yet in other embodiments, the top and bottom liner sections are joined together without welding, threading, crimping or using of any adhesive materials.

Still in other embodiments, the peripheral edge of one of said top or bottom liner section comprises a recessed area comprising said channel such that a peripheral edge of the other liner section covers said recessed area to produce said slot for holding the peripheral edge of said elastomeric separation diaphragm in a fixed position.

In other embodiments, the parameter of [(maximum service pressure×internal volume)/mass of said accumulator] of the lightweight composite diaphragm accumulator of the invention is in the range of 10,000 to 100,000 Pa*m$^3$/kg. Yet in other embodiments, the parameter of [(maximum service pressure×internal volume)/mass of said accumulator] is a least 20,000 Pa*m$^3$/kg.

Still in other embodiments, each of said top and bottom liner section comprises a material independently selected from the group consisting of aluminum, steel, titanium, inconel, brass, ceramic, polymer and composite material.

Yet in other embodiments, said first pressure medium is a gas; and said second pressure medium is a liquid. In some instances, said gas comprises an inert gas.

In another embodiment, the interior of said accumulator comprises a phase changing material.

Still in another embodiment, one of said first or second pressure medium comprises a cellular foam material.

In yet another embodiment, one of said first or second chambers further comprises a spring like member that stores energy when compressed.

Another aspect of the invention provides a method for producing a composite overwrapped pressure vessel. The method generally includes (i) joining a plurality of sections together to form a liner; and (ii) overwrapping said liner with a composite material thereby providing mechanical strength for holding said liner sections under pressure and to provide a sufficient stiffness and mechanical strength to prevent leakage of a fluid medium contained within the liner of the said pressure vessel. Typically, said liner is produced without any welding, threading, crimping or use of any adhesive between said plurality of sections. In some embodiments, the parameter of [(maximum service pressure×internal volume)/mass of said composite overwrapped pressure vessel] is in the range of from about 10,000 to about 100,000 Pa*m$^3$/kg.

As can be seen, the lightweight composite high pressure vessel of the invention lacks any welding, threading or crimping to achieve leak-proof property. Furthermore, no adhesive material is used in mating two or more sections of the liner housing. In fact, in lightweight composite pressure vessels of the invention, the plurality of sections are mated or joined together without leakage of any fluid medium without welding, threading, crimping or using any adhesive materials. The mechanical strength of the pressure vessels of the invention are provided by the composite overwrap whereas the leak-proof aspects of the pressure vessels of the invention are provided by the elastomeric seal between the liner sections. Such use of the fabricating the liner in sections reduces the cost and time in manufacturing process of the liner and hence the composite pressure vessel. Furthermore, the use of a distinct joint between the liner sections in the composite pressure vessel ensures a leak-before-burst failure mode unlike the welded, threaded or crimped high pressure vessels.

The present invention provides lightweight diaphragms that take advantage of the structural load and pressure carrying capability of composite materials. In particular, the present invention provides a lightweight, composite overwrapped diaphragm accumulator by eliminating the welding, threading or crimping process and by reducing internal parts to hold the diaphragm in place inside the diaphragm accumulator.

DETAILED DESCRIPTION OF THE INVENTION

The present invention will now be described with regard to the accompanying drawings which assist in illustrating various features of the invention. In this regard, the present invention generally relates to a lightweight composite overwrapped high pressure vessel including, but not limited to, a high pressure vessel that is useful such as a diaphragm accumulator. That is, the invention relates to a lightweight composite overwrapped high pressure vessel that comprises a plurality of sections that are mated or joint together with an elastomeric seal in between the sections to form a liner. The liner is than overwrapped with a composite material. By using an elastomeric seal between the liners and a composite material overwrap that provides mechanical strength and structural integrity of the liner housing, use of welding, threading or crimping is avoided. A composite material, or simply "composite" as used herein includes a material made from two or more constituent materials with significantly different physical or chemical properties. When combined, these materials produce a composite material with characteristics typically different from the individual components. It should be appreciated the individual components may remain separate and distinct within the finished structure. The new material or composite material is preferred for many reasons, including but not limited to, being stronger, lighter, or less expensive compared to traditional materials. In one particular embodiment, composites of the invention are carbon fiber based composite materials, such as carbon fiber-reinforced polymers.

Two embodiments of lightweight composite overwrapped high pressure vessels are generally illustrated in FIGS. 1 to 4B. It should be appreciated that the accompanying figures are provided solely for the purpose of illustrating the practice of the present invention and do not constitute limitations on the scope thereof.

Figure 1:
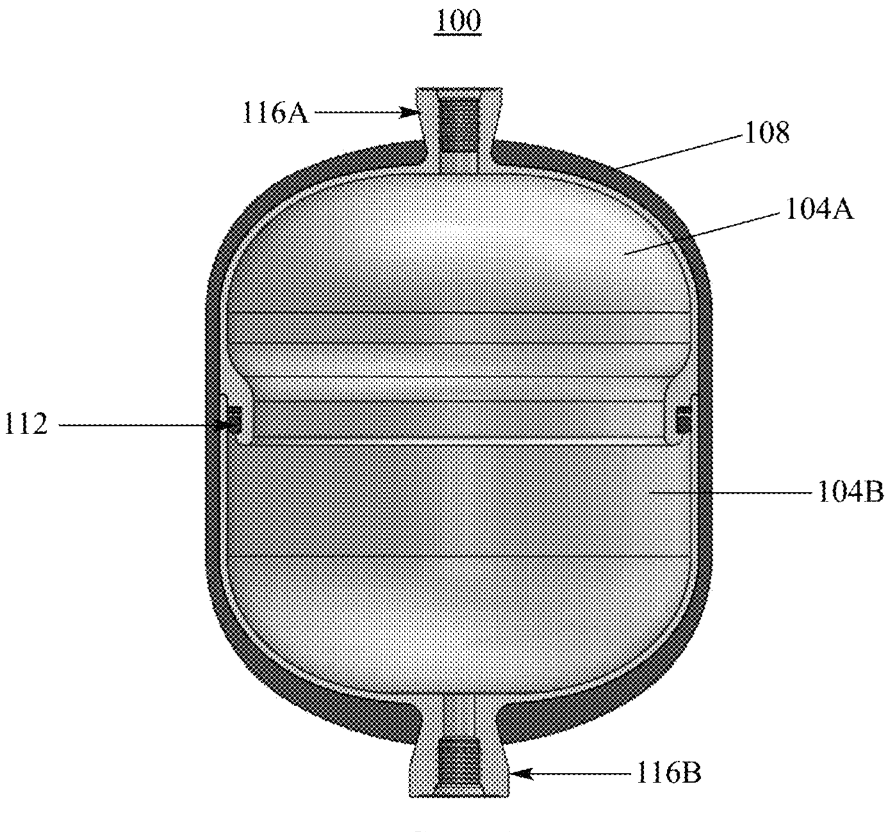
FIG. 1 is a cutaway view of a lightweight composite high pressure vessel of the invention.
Figure 2:
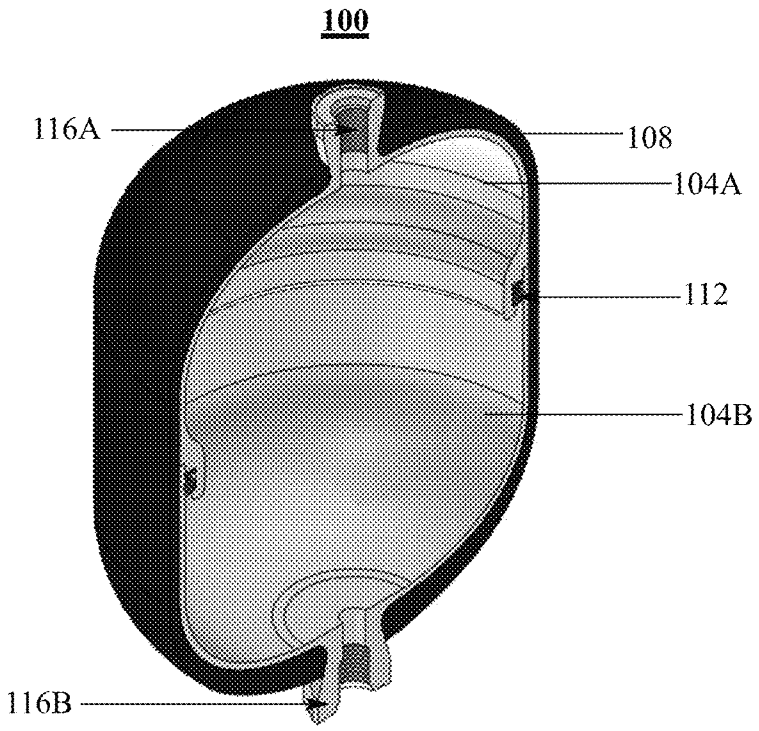
FIG. 2 is a side cutaway view of a lightweight composite high pressure vessel of the invention.

As shown in FIGS. 1 and 2, the lightweight composite overwrapped high pressure vessel 100 comprises a plurality of liner sections (104A and 104B in FIGS. 1 and 2). It should be appreciated that while the accompanying figures typically show only two sections that are mated or joined, the number of sections that can form a liner is not limited to two. The liner (i.e., pressure vessel without the composite overwrap 108) can be made from three sections or more sections, four or more sections, and so forth. The only requirement in the scope of the invention is that the total number of pressure housing sections, when joined or mated together form one complete liner.

Referring again to FIGS. 1 and 2, the liner sections are mated or joined with an elastomeric o-ring 112 as a joint sealing means. The presence of o-ring 112 prevents any fluid medium contained in the liner from leaking out when the liner is structurally supported by the composite overwrap. As can be seen in FIGS. 1 and 2, the o-ring 112 is placed in a channel or a slot that is present in one of the sections of the liner section. The presence of this slot or channel is more clearly illustrated in FIGS. 4A and 4B as element 240. This channel or slot also aids in placement of the o-ring 112 during the manufacturing process.

The lightweight composite overwrap high pressure vessel 100 includes a composite overwrap 108 that provides the mechanical strength and/or structural integrity of the high pressure vessel. The lightweight composite overwrap high pressure vessel 100 can also include one or more orifices or ports 116A and 116B. For example, when the lightweight composite overwrap high pressure vessel 100 is used as a simple gas cylinder, one of the ports or orifices 116A or 116B is absent such that the gas can flow in or out through a single port or orifice.

Figure 3:
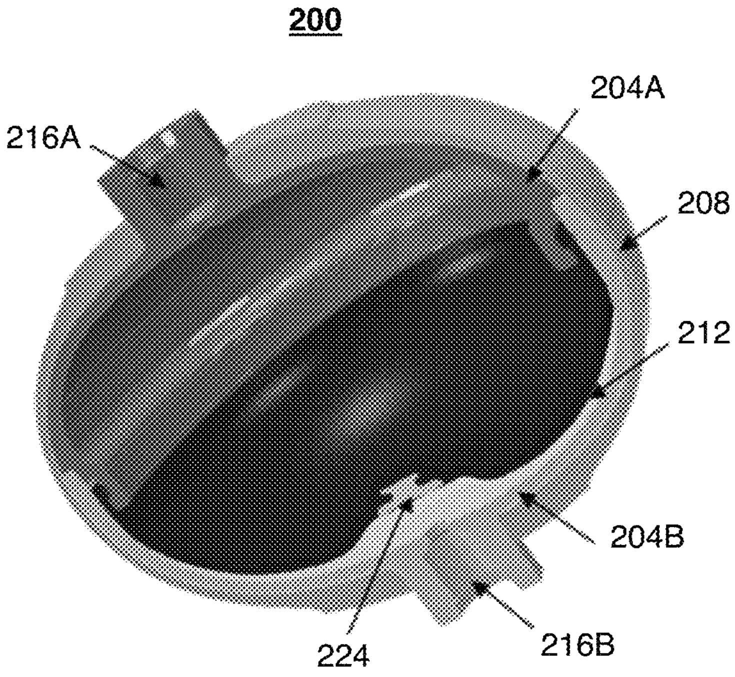
FIG. 3 is a cutaway view of a lightweight composite diaphragm accumulator of the invention.
Figure 4A:
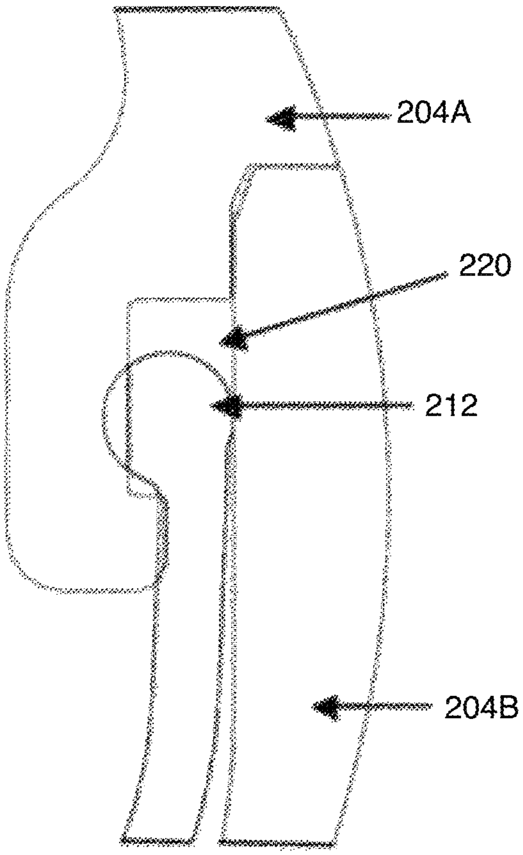
FIG. 4A is one particular embodiment of an expanded cross-sectional view of the diaphragm bulb and mating liner sections of a lightweight composite diaphragm accumulator of the present invention prior to overwrapping the accumulator housing with a composite material.
Figure 4B:
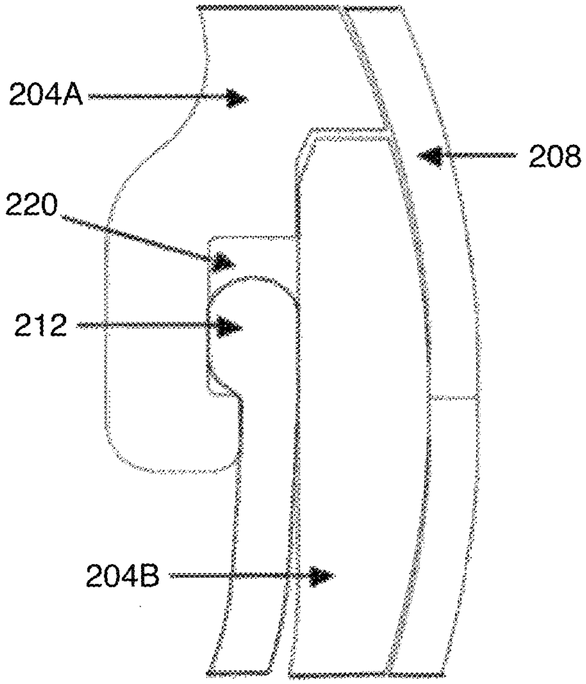
FIG. 4B is an expanded cross-sectional view of the lightweight composite accumulator housing of FIG. 4A after it has been overwrapped with a composite material to provide mechanical strength support.

One specific aspect of the present invention is illustrated in FIGS. 3, 4A and 4B. In this aspect of the invention, the lightweight composite overwrap high pressure vessel 100 is a hydraulic accumulator or a diaphragm accumulator as shown in FIG. 3.

A hydraulic accumulator is an energy storage device. It consists of a high pressure vessel in which a non-compressible hydraulic fluid is held under pressure by an external source. These accumulators are based on the principle that gas is compressible and oil (or other liquid) is in general incompressible. In a hydraulic accumulator, the liner housing is divided into two sections, one containing a gas another containing a liquid, typically an oil. In operation, oil flows into the accumulator and compresses the gas by reducing its storage volume. Energy is stored by the volume of hydraulic fluid that compressed the gas under pressure. If the oil is released, it will quickly flow out under the pressure of the expanding gas. Accumulators are widely used in industrial hydraulics to dampen pulsations, compensate for thermal expansion, or provide auxiliary power.

A diaphragm accumulator consists of pressure vessel with an internal elastomeric diaphragm that separates pressurized gas (typically nitrogen gas) on one side from the hydraulic fluid (typically an oil) on the other side (e.g., system side). The accumulator is charged with nitrogen through a valve installed on the gas side. In a diaphragm accumulator, the energy is stored by compressing nitrogen within the gas chamber side with the oil pushing against the diaphragm. Energy is released when the diaphragm is decompressed thereby pushing the hydraulic fluid out of the accumulator's fluid port.

Most legacy diaphragm accumulators are made of steel. They are heavy and bulky. The mass of the lightweight, composite overwrapped diaphragm accumulator of the present invention is a fraction of that of the steel counterparts. Consequently, they provide improved power and energy densities (power and energy per unit mass) that are beneficial in a variety of application including, but not limited to, robotics, automobiles, aircrafts, prosthetics, pulsation dampeners, etc. Moreover, since diaphragm accumulators of the invention are lighter, i.e., has lower mass compared to conventional accumulators of the same volume, they are easier to fabricate, ship, install and maintain.

The diaphragm accumulators of the invention have at least two parts that are joined or mated together without welding, threading or crimping.

Some of the advantages of the diaphragm accumulators of the invention include, but are not limited to, (i) small weight to volume ratio, thereby making them highly suitable for mobile and airborne applications; (ii) fast response time; (iii) good dynamic response characteristics for shock or pulsation dampening application; (iv) higher compression ratio (e.g., typically at least about 5:1, often at least about 6:1, and more often at least about 8:1) than bladder accumulators, which are generally about 4:1; (v) less susceptible to contamination than piston accumulators; and (vi) minimal impact on performance for deviating from the vertical position. Throughout this disclosure, the term "about" when referring to a numerical value means ±20%, typically ±10%, often ±5%, and most often ±2% of the numeric value.

Other advantages of lightweight composite overwrapped high pressure vessels of the invention (including hydraulic and diaphragm accumulators) include the following specific parameter values. In particular, the parameter of [(maximum service pressure×internal volume)/mass of the composite overwrapped high pressure vessel of the invention] is in the range of about 5,000 to 500,000 Pa*$m^3$/kg, typically about 10,000 to 200,000 Pa*$m^3$/kg, and often about 10,000 to about 100,000 Pa*$m^3$/kg. Yet in other embodiments, the parameter of [(maximum service pressure×internal volume)/mass of the composite overwrapped high pressure vessel of the invention] is a least about 5,000 Pa*m$^3$/kg, typically at least about 10,000 Pa*m$^3$/kg and often at least about 20,000 Pa*m$^3$/kg.

One particular embodiment of light weight diaphragm accumulator is generally illustrated in FIGS. 3, 4A and 4B. It should be appreciated that the shape of light weight diaphragm accumulators of the invention can vary significantly depending on its use and applications. In particular, the shape of diaphragm accumulators of the invention can be ellipsoidal, isotensoidal, spherical, ovaloid, toroidal or cylindrical with isotensoidal domes or any other suitable shape desired for a given purpose or intended use. However, for the sake of brevity and clarity, the present disclosure illustrates spherical or ellipsoidal diaphragm accumulator.

Referring to FIG. 3, the lightweight diaphragm accumulator has at least two sections or parts. In particular, as shown in FIG. 3, the diaphragm 212 that is located interior of the accumulator housing 200 is enclosed between two mating halves of a liner, referred to as top and bottom halves or top and bottom liner sections 204A and 204B, respectively. As discussed above, the accumulator housing (i.e., liner with diaphragm) can be made from more than two sections. Referring again to FIG. 3, each of the liner sections 204A and 204B can be independently made from metal, ceramic, metal alloy, polymer or composite material. In addition, each section can be machined or net formed. Generally, in order to reduce the overall weight, a lightweight material is used for each of the liner sections. Suitable materials for each liner section include, but are not limited to, metals such as aluminum, aluminum alloys, steel alloys, titanium, copper and brass; polymer such as polyethylene, polyamide, polyimide; ceramics such as alumina, silicone nitride; metal alloys such as inconel and invar; composites such as polymer matrix and metal matrix; and other suitable light materials.

Referring to FIGS. 3, 4A and 4B, in a diaphragm accumulator 200, there is a diaphragm 212 that separates the incompressible fluid in one compartment (e.g., below diaphragm 212) from the compressible gas in another compartment (e.g., above diaphragm 212). Thus, the diaphragm accumulator 200 has a first fluid medium compartment (e.g., gas compartment, i.e., space between the top-half section 204A and diaphragm 212) and a second fluid medium compartment (e.g., a liquid or oil compartment, i.e., space between the bottom-half section 204B and diaphragm 212). The diaphragm accumulator 200 also has a port or an orifice 216A that allows the gas to enter/escape the first fluid medium compartment of the accumulator; and a port or an orifice 216B that can be used to inject or remove the second fluid medium (e.g., liquid or oil) from the second fluid medium compartment. As can be seen in FIG. 3, the diaphragm accumulator housing is overwrapped with a composite material 208 to provide mechanical strength and/or maintain structural integrity of the diaphragm accumulator 200.

The diaphragm 212 can be made of elastomeric material such as buna-Nitrile rubber, HNBR, EPDM, silicon, Viton, etc. Any material that is elastic and can maintain its elasticity for an extended period of time (e.g., at least one year, typically at least three years, often at least five years, and most often at least ten years) can be used. However, it should be appreciated that the scope of the invention is not limited to such a period of usefulness of the elastomeric material.

In some embodiments, the diaphragm can be of pleated construction and made of metal or thermoplastic such as PTFE, Nylon, polyethylene, PVDF or Mylar. The pleated construction allows such a diaphragm to stretch and contract, thereby allowing change in the volume of the first and/or the second fluid medium compartments.

In operation, typically, the gas compartment is precharged with inert gas (typically Nitrogen) using gas charge valve fitted to the gas port 216A. Liquid (typically hydraulic fluid in hydro-pneumatic application) is allowed to enter from the hydraulic system into the diaphragm accumulator 200 through the fluid port 216B.

It should be appreciated the fluid and gas ports (216B and 216A, respectively) can be integral to the liner halves (machined or cast) or they can be attached to the liner halves in a secondary operation such as threading or adhesive bonding.

In some embodiments, the diaphragm 212 has a bulb at the top periphery (see FIGS. 4A and 4B) that is captured in a groove 220 housed between the mating halves of the two sections of the liner 204A and 204B. The bulb section of the diaphragm can be an integral part of the diaphragm 212 or can consist of a separate section (not shown) attached to the top periphery of the diaphragm 212.

The geometry of the bulb (i.e., the top periphery of diaphragm 212 as shown in FIGS. 4A and 4B), the groove 220 in the liner halves that house the bulb, the stiffness of the liner 204A and 204B in the zone surrounding the groove 220 and the stiffness provided by the composite overwrap 208 (FIG. 4B) are designed to prevent fluid leakage (both gas and fluid) at the mating surface between the two sections of the liner.

The effectiveness of the bulb in the diaphragm to provide a pressure-tight seal between the two liner sections is typically determined by one or more of the following: (i) the amount of pre-compression achieved during the mating or assembly of the two halves of the liners 204A and 204B; (ii) the pre-stress imparted on the liner sections 204A and 204B during the composite overwrapping process using pre-tensioned fiber tows; and (iii) the pre-stress achieved during the autofrettage process of the composite overwrapped vessel after the composite fabrication is complete.

In some cases, the diaphragm 212 is subjected to precharge pressure on the gas side in the absence of hydraulic fluid. Thus, in some embodiments, a stop 224 that is more rigid than the diaphragm 212 is attached to the bottom of the diaphragm. Alternatively, the stop 224 can be present in the interior of the bottom liner section 204B. The stop 224 prevents extrusion of the diaphragm 212 through the fluid port 216B in the absence of any fluid pressure in the fluid compartment.

Under hydraulic operation when there is liquid or oil in the fluid compartment, the pressure in the fluid compartment equals that in the gas compartment and the diaphragm 212 is under neutral pressure acting perpendicular to the diaphragm thickness.

In one embodiment, the internal pressure in the fluid and gas compartments being equal is supported by both sections of the liner and the composite overwrap over the liner. Yet in another embodiment, the internal pressure is supported entirely by the two sections of the liner if they are bonded, welded or fastened together.

When fluid enters the fluid compartment through fluid port 216B, the diaphragm 212 deforms towards the gas compartment and compresses the gas to restore pressure equilibrium between the gas and the fluid compartments. Energy is stored in the compressed gas. When the pressure in the fluid compartment drops or when fluid leaves the fluid compartment through fluid port 216B, the diaphragm 212 regains its original configuration by expanding towards the fluid compartment thereby decompressing the gas and recovering the stored energy. In the absence of any external pressure, the pressure on the gas is always in equilibrium with the pressure of the incompressible fluid.

Still in another embodiment, the gas compartment is partially or fully filled with elastomeric material, foam or other compressible material. This allows use of a material other than or in conjunction with gas in the gas compartment side.

Yet still in another embodiment, the elastomeric material or foam occupying the gas compartment can include a phase change material (PCM). When the gas is compressed quickly it results in temperature rise. When the temperature settles, the pressure in the gas compartment drops. This results in less-than-desirable fluid volume that is expelled when the stored energy is recovered. Use of a PCM in the gas compartment allows improved thermal management of the compressed gas during each energy storage and recovery cycle, and therefore allow the accumulator to deliver peak power and operate more efficiently in each cycle.

Typically, the phase-change material is used to reduce the amount of temperature increase compared to a similar accumulator that does not have the phase-change material but is otherwise made of the same material. Typically, the PCM comprises a material that melts (i.e., changes phase) from solid to liquid at a certain temperature. The useful PCMs of the invention have a melting point in the range of from about 0° C. to about 80° C. typically from about 20° C. to about 50° C. PCMs are "latent" heat storage materials. The thermal energy transfer occurs when a material changes from solid to liquid, or liquid to solid. This is called a change in state, or "Phase." Compared to the storage of sensible heat, there is no significant temperature change during the phase change. Initially, these solid-liquid PCMs perform like conventional storage materials; their temperature rises as they absorb heat. Unlike conventional (sensible) storage materials, PCMs absorb and release heat at a nearly constant temperature. PCMs can store 5 to 14 times more heat per unit volume than sensible storage materials such as water, masonry, or rock. A large number of PCMs are known to melt with a heat of fusion in any required range. However, for their employment as latent heat storage materials these materials should exhibit certain desirable thermodynamic, kinetic and chemical properties. Moreover, economic and ready availability of these materials may also be considered.

One of the factors in selecting a particular PCM for a given application include matching the transition temperature of the PCM for the given application. In addition, the operating temperature of heating or cooling should be matched to the transition temperature of the PCM. The latent heat should be as high as possible, especially on a volumetric basis, to minimize the physical size of the heat stored. High thermal conductivity would assist the charging and discharging of the energy storage.

Exemplary PCMs that are suitable for the invention include, but not limited to, organic materials such as paraffin and fatty acids, salt hydrates, water, eutectics, naturally occurring hygroscopic materials, metals and metallic particles, nano-materials. Some of the particular PCMs suitable for the invention include, but are not limited to, heptanone-4®, n-Unedane®, TEA_16®, ethylene glycol, n-dodecane, Thermasorb 43®, Thermasorb 65®, Thermasorb 175+®, Thermasorb 215+®, sodium hydrogen phosphate, Micronal®, and an assortment of other polymeric PCMs.

In another embodiment, the gas compartment contains a spring like device that stores energy by compression. The spring can be made of metal, polymer, elastomer, PCM or composite.

In one particular embodiment, the gas port can be sufficiently large to allow insertion of a bladder that separates the gas from the fluid. This allows for a diaphragm accumulator with a replaceable or serviceable diaphragm.

Unlike monolithic and isotropic material like steel, a composite overwrapped pressure vessel with a large port opening can be designed to withstand very high internal pressure. This is enabled by an optimized design of the structural shape and composite layup such that the composite material is adequately and optimally placed to support the internal pressure. The composite overwrap of the accumulator can be fabricated using filament winding, polar winding, tumble winding, resin transfer molding, vacuum assisted resin transfer molding or a combination thereof. Typically, in these fabrication methods, the composite will consist of high stiffness and high strength fibers like carbon, glass, aramid, basalt or ceramic In some embodiments, the fibers in the composite overwrap layer is impregnated with matrix materials such as epoxy resin, vinyl ester resin, polyester resin, metal or thermoplastics. Alternatively, the composite fibers is not impregnated with matrix materials, i.e., reinforcement is provided by dry fibers only.

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

Functioning units of composite overwrapped diaphragm accumulators have been made, tested and used on commercial applications using the invention disclosed herein. Two sizes: 0.5 L and 2 L have been produced and tested. The 0.5 L diaphragm accumulator measures 125 mm dia.×130 mm overall length including the gas port, has a maximum service pressure of 240 bar and weighs 0.5 kgs. providing a [(maximum service pressure×internal volume)/mass] factor of 24,000 Pa*$m^3$/kg. The liner sections of the 0.5 L diaphragm accumulator were fabricated by machining Al 6061-T6 alloy and were assembled along with a diaphragm in between the liner sections to form the accumulator housing. The accumulator housing was subsequently overwrapped with composite material using a filament winding method. After the composite was cured, the assembly was subjected to autofrettage and proof test at 360 bar using water on both compartments (either side of the diaphragm) during which there was no leakage of fluid observed from the pressure vessel. Subsequent to proof test, both compartments were emptied, cleaned and dried. The gas compartment was precharged with Nitrogen gas using a valve port and the valve was closed, sealing off the gas compartment. The fluid compartment was filled with hydraulic oil and connected to a hydraulic pressurization line. The composite diaphragm accumulator was then subjected to hydro-pneumatic cycle tests between the pressure limits of 120 bar and 240 bar for more than 100,000 cycles. The precharge pressure held constant in the gas compartment during and after the test indicating successful operation of the diaphragm accumulator.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

What is claimed is:

1. A lightweight composite overwrapped pressure vessel comprising:

(i) a liner housing body consisting essentially of a first section and a second section assembled together to form said liner housing body, wherein a peripheral edge of said first section comprises a channel such that a peripheral edge of said second section that is juxtaposed with said first section forms a slot; and (ii) a composite overwrap material encasing said liner housing body and providing mechanical strength for holding said liner housing body under pressure and providing a sealing means to prevent leakage of a fluid medium contained within said liner housing body, wherein said lightweight composite overwrapped pressure vessel is subjected to pre-stressing (a) during said step (i), (b) during said step (ii), (c) during an autofrettage process, or (d) a combination thereof.

2. The lightweight composite overwrapped pressure vessel of claim 1, wherein said pressure vessel is a diaphragm accumulator.

3. The lightweight composite overwrapped pressure vessel of claim 2, wherein said first and said second sections of said liner housing body comprise first and second orifices, respectively, for introducing first and second pressure mediums, respectively; and a diaphragm subdividing an interior of said liner housing body into a first pressure medium storage area and a second pressure medium storage area, said first pressure medium storage area accommodating first pressure medium, said second pressure medium storage area accommodating second pressure medium, wherein a peripheral edge of said diaphragm is inserted into said slot, thereby securing the peripheral edge of said diaphragm therebetween.

4. The lightweight composite overwrapped pressure vessel of claim 1, wherein said first and second sections are assembled together without welding, threading or crimping.

5. The lightweight composite overwrapped pressure vessel of claim 1, wherein the parameter of [(maximum service pressure×internal volume)/mass of said pressure vessel] is in the range of 10,000 to 100,000 Pa*$m^3$/kg.

6. The lightweight composite overwrapped pressure vessel of claim 1, wherein the parameter of [(maximum service pressure×internal volume)/mass of said pressure vessel] is at least 20,000 Pa*$m^3$/kg.

7. A lightweight composite overwrapped diaphragm accumulator comprising:

(i) an accumulator housing consisting essentially of:

(a) top and bottom liner sections assembled together to form said accumulator housing, wherein a peripheral edge of one of said top or bottom liner sections contains a channel such that the peripheral edges of top and bottom liner sections that are assembled together forms a slot, and wherein said top and bottom liner sections comprise first and second orifices, respectively, for introducing first and second pressure mediums, respectively; and (b) a diaphragm subdividing an interior of said accumulator housing into first and second pressure medium storage areas, said first pressure medium storage area accommodating first pressure medium, said second pressure medium storage area accommodating second pressure medium, wherein a peripheral edge of said diaphragm is inserted into said slot, thereby securing the peripheral edge of said diaphragm therebetween; and (ii) composite overwrap encasing said accumulator housing and providing mechanical strength for holding said accumulator housing under pressure and to provide a sufficient stiffness and mechanical strength to prevent leakage of first or second pressure medium, wherein said lightweight composite overwrapped diaphragm accumulator is subjected to pre-stressing (a) during said step (i)(a), (b) during said step (ii), or (c) a combination thereof.

8. The lightweight composite overwrapped diaphragm accumulator according to claim 7, wherein said top and bottom liner sections are assembled together without welding, threading, crimping or bonding by adhesive.

9. The lightweight composite overwrapped diaphragm accumulator according to claim 7, wherein the peripheral edge of one of said top or bottom liner section comprises a recessed area comprising said channel such that a peripheral edge of the other liner section covers said recessed area to produce said slot for holding the peripheral edge of said diaphragm in a fixed position.

10. The lightweight composite diaphragm accumulator according to claim 7, wherein the parameter of [(maximum service pressure×internal volume)/mass of said accumulator] is in the range of 10,000 to 100,000 Pa*$m^3$/kg.

11. The lightweight composite diaphragm accumulator according to claim 7, wherein the parameter of [(maximum service pressure×internal volume)/mass of said accumulator] is a least 20,000 Pa*$m^3$/kg.

12. The lightweight composite diaphragm accumulator according to claim 7, wherein each of said top and bottom liner section comprises a material independently selected from the group consisting of aluminum, steel, titanium, brass, a metallic alloy, a polymer, and a composite material.

13. The lightweight composite diaphragm accumulator according to claim 12, wherein said metal alloy is a nickel-chromium alloy.

14. The lightweight composite diaphragm accumulator according to claim 7, wherein said first pressure medium is a gas; and said second pressure medium is a liquid.

15. The lightweight composite diaphragm accumulator according to claim 14, wherein said gas comprises an inert gas.

16. The lightweight composite diaphragm accumulator according to claim 7, wherein the interior of said accumulator comprises a phase changing material.

17. The lightweight composite diaphragm accumulator according to claim 7, wherein one of said first or second pressure medium comprises a cellular foam material.

18. The lightweight composite diaphragm accumulator according to claim 7, wherein one of said first or second chambers further comprises a spring like member that stores energy when compressed.

19. A method for producing a composite overwrapped pressure vessel, said method comprising:

(i) forming a liner body from two sections without welding, threading, crimping or bonding by adhesive; and (ii) overwrapping said liner with a composite material thereby providing mechanical strength for holding said pressure vessel under pressure and to provide a sufficient stiffness and mechanical strength to prevent leakage of a fluid medium contained within said liner, wherein said composite overwrapped pressure vessel is subjected to pre-stressing:

(a) during said step (i), (b) during said step (ii), (c) during an autofrettage process, or (d) a combination thereof.

20. The method of claim 19, wherein the parameter of [(maximum service pressure×internal volume)/mass of said composite overwrapped pressure vessel] is in the range of from about 10,000 to about 100,000 Pa*$m^3$/kg.

* * * * *